(12) United States Patent
Seghi

(10) Patent No.: US 11,313,494 B2
(45) Date of Patent: Apr. 26, 2022

(54) HYDRAULIC HOSE

(71) Applicant: MANULI HYDRAULICS ITALIA S.R.L., Milan (IT)

(72) Inventor: Paolo Seghi, Milan (IT)

(73) Assignee: MANULI HYDRAULICS ITALIA S.R.L., Milan (IT)

( * ) Notice: Subject to any disclaimer, the term of this patent is extended or adjusted under 35 U.S.C. 154(b) by 177 days.

(21) Appl. No.: 16/583,917

(22) Filed: Sep. 26, 2019

(65) Prior Publication Data

US 2020/0103058 A1    Apr. 2, 2020

(30) Foreign Application Priority Data

Oct. 2, 2018 (IT) .......................... 102018000009085

(51) Int. Cl.
*F16L 11/00*  (2006.01)
*F16L 11/08*  (2006.01)

(52) U.S. Cl.
CPC .................................. *F16L 11/082* (2013.01)

(58) Field of Classification Search
CPC .................................................. F16L 11/082
USPC ........................................ 138/126, 132, 133
See application file for complete search history.

(56) References Cited

U.S. PATENT DOCUMENTS

| | | | |
|---|---|---|---|
| 3,212,528 A | 10/1965 | Haas | |
| 3,433,882 A * | 3/1969 | Henriksen | H01B 9/001 174/15.7 |
| 3,446,248 A * | 5/1969 | Press | F16L 11/10 138/133 |
| 3,481,368 A * | 12/1969 | Vansickle | F16L 11/088 138/125 |
| 3,729,028 A * | 4/1973 | Horvath | F16L 11/088 138/130 |
| 3,866,633 A * | 2/1975 | Taylor | F16L 11/083 138/130 |
| 3,905,399 A * | 9/1975 | Dunnet | F16L 11/133 138/129 |
| 4,343,333 A * | 8/1982 | Keister | F16L 11/086 138/125 |

(Continued)

FOREIGN PATENT DOCUMENTS

| | | |
|---|---|---|
| EP | 0937933 A1 | 8/1999 |
| FR | 3017438 A1 | 8/2015 |

(Continued)

OTHER PUBLICATIONS

European Search Report; Application No. 19200675.7-1010; dated Jun. 8, 2020; 11 Pages.

(Continued)

*Primary Examiner* — James F Hook
(74) *Attorney, Agent, or Firm* — Whitmyer IP Group LLC

(57) ABSTRACT

A reinforced multi-layer hydraulic hose, including a plurality of anti-pressure layers with coiled wires or yarns at a winding angle of about 54.7° with respect to a longitudinal central axis of the hose, and at least one anti-tensile stress reinforcing layer that improves the resistance to the axial force of the hose and has at least one plait or coil of steel wires at a winding angle of less than 35°, in which the hose, owing to the high resistance to the axial force, can be used in a rectilinear configuration to supply a hydraulic fluid also in the presence of significant axial forces.

18 Claims, 8 Drawing Sheets

(56) References Cited

U.S. PATENT DOCUMENTS

| | | | | |
|---|---|---|---|---|
| 4,431,034 A | * | 2/1984 | Abdullaev | B29C 70/207 |
| | | | | 138/130 |
| 4,693,281 A | * | 9/1987 | Creedon | F16L 11/083 |
| | | | | 138/130 |
| 6,263,921 B1 | * | 7/2001 | He | F16L 9/128 |
| | | | | 138/174 |
| 7,530,372 B2 | * | 5/2009 | Gerez | F16L 11/082 |
| | | | | 138/134 |
| 2007/0034275 A1 | * | 2/2007 | Henry | F16L 11/086 |
| | | | | 138/124 |
| 2011/0290362 A1 | * | 12/2011 | Weil | F16L 11/083 |
| | | | | 138/129 |

FOREIGN PATENT DOCUMENTS

| | | |
|---|---|---|
| GB | 1486445 A | 9/1977 |
| WO | 2010110941 A1 | 9/2010 |

OTHER PUBLICATIONS

Italian Search Report & Written Opinion Application No. IT201800009085 dated Jun. 17, 2019 11 Pages.

\* cited by examiner

HYDRAULIC HOSE

TECHNICAL FIELD

The invention relates to a hydraulic hose, in particular a hydraulic hose for conveying high pressure fluid.

BACKGROUND OF THE INVENTION

It is known that a high pressure hydraulic hose has to be reinforced with metal wires or cords arranged according to a particular angle with respect to the axis of the hose to withstand the internal pressure.

One variation of this angle determines in the hydraulic hoses a loss of resistance to the pressure and thus risks of damage to and/or breakage of the product with potential serious consequences for plants and persons.

A recurrent cause of significant variation in the angle of application of the metal reinforcements is the presence of axial tensile stress in the hydraulic hose in operating conditions.

For this reason, according to current design and construction technology, hydraulic hoses must not be applied in the presence of axial tensile stress, which entails application limitations, or plants with a more complex and expensive design to eliminate or reduce such tensile stress.

Specifically, but not exclusively, such conditions of possible tensile stress to the hydraulic hose exist in the field of foundation plants, in underground injection plants, in piling plants, etc.

Specifically, but not exclusively, such conditions of possible tensile stress to the hydraulic hose exist also in any type of application that uses long products and of large dimensions, for example in an off-shore environment, where the very weight of the piping and of the liquid contained therein can apply important axial loads by the force of gravity.

It is known that in order to solve this problem, a support means is used that has high resistance to tensile stress (for example a metal cable) that is external and parallel to the hydraulic hose. This known solution is however expensive, complicated and hardly practical.

SUMMARY OF THE INVENTION

One object of the invention is to devise a hydraulic hose that is able to overcome the aforesaid problem of the prior art.

One advantage is to give rise to a reinforced hydraulic hose with high resistance to tensile stress.

One advantage is to provide a hydraulic hose that is able to withstand both high internal pressure, and great axial tensile stress.

One advantage is to make available a very reliable hydraulic hose to supply a high pressure fluid over a significant length.

One advantage is to permit great durability and reliability of the hydraulic hose also in very difficult conditions of use, particular for a very heavy and long hose and along which a rectilinear configuration has to be maintained.

One advantage is to have a hydraulic hose with an additional reinforcing layer that enables contacts and blows from the exterior and deformation from movement of the product to be withstood better.

One advantage is to have a hydraulic hose with an additional reinforcing layer that can withstand extreme abrasion and peeling conditions without compromising the integrity and the resistance of the pressure-resistant reinforcement.

One advantage is to provide a hydraulic hose with great durability.

One advantage is to obtain a multi-layer reinforced hydraulic hose that is constructionally simple and cheaper than complex systems that require external independent reinforcements to be added.

One advantage is to obtain an integrated hydraulic hose with great ease and convenience of installation and use.

Such objects and advantages, and still others, are achieved by a hydraulic hose according to one or more of the claims set out below.

In one embodiment, a (flexible multi-layer) hydraulic hose comprises a plurality of first reinforcing layers configured to improve the resistance of the hose to the internal pressure and comprising wires (made of steel) that are that are helically wound (coiled and/or plaited), and at least one second reinforcing layer configured to improve the resistance of the hose to the axial tensile stress and comprising wires (made of steel) that are helically wound (plaited and/or coiled) at a winding angle, with respect to the longitudinal axis of the hose, that is smaller than the winding angle of the wires of the aforesaid first reinforcing layers. The first (anti-pressure) reinforcing layers and the second (anti-tensile stress) reinforcing layer may be alternated between one another with intermediate layers made of elastomeric material.

In one embodiment, a hydraulic hose comprises two, three or more anti-pressure reinforcing layers, each of which includes helically wound wires at a winding angle, with respect to the longitudinal axis of the hose, comprised in the range 54.7°±10° (54.7° being the value of the so-called "neutral angle"), and at least one anti-tensile stress reinforcing layer, optionally more external than the anti-pressure reinforcing layers, that includes helically wound wires at a winding angle of less than 35°.

In one embodiment, a hydraulic hose comprises an anti-tensile stress reinforcing layer situated immediately below a covering layer (made of an elastomeric material) that is the outermost layer of the hose; the hydraulic hose may comprise at least one more internal anti-pressure reinforcing layer of the anti-tensile stress reinforcing layer, with helically wound wires; the anti-tensile stress reinforcing layer may comprise helically wound (for example plaited) wires with a winding pitch that is longer than a winding pitch of the wires of the anti-pressure reinforcing layer.

In one embodiment, a hydraulic hose comprises two, three or more anti-pressure reinforcing layers, each of which includes helically wound wires at a winding angle, with respect to the longitudinal axis of the hose, comprised in the range 54.7°±10° (54.7° being the value of the so-called "neutral angle"), and at least one, optionally more internal, anti-tensile stress reinforcing layer of the anti-pressure reinforcing layers, which includes helically wound wires at a winding angle of less than 35°.

In one embodiment, a hydraulic hose comprises an anti-tensile stress reinforcing layer situated immediately above a substrate (made of an elastomeric material) that is the most internal layer of the hose; the hydraulic hose may comprise at least one more external anti-pressure reinforcing layer of the anti-tensile stress reinforcing layer, with helically wound wires; the anti-tensile stress reinforcing layer may comprise helically wound (for example plaited) wires with a longer winding pitch than a winding pitch of the wires of the anti-pressure reinforcing layer.

BRIEF DESCRIPTION OF THE DRAWINGS

The invention can be better understood and implemented with reference to the attached drawings that illustrate some embodiments thereof by way of non-limiting example, in which.

DETAILED DESCRIPTION

Figure 1:
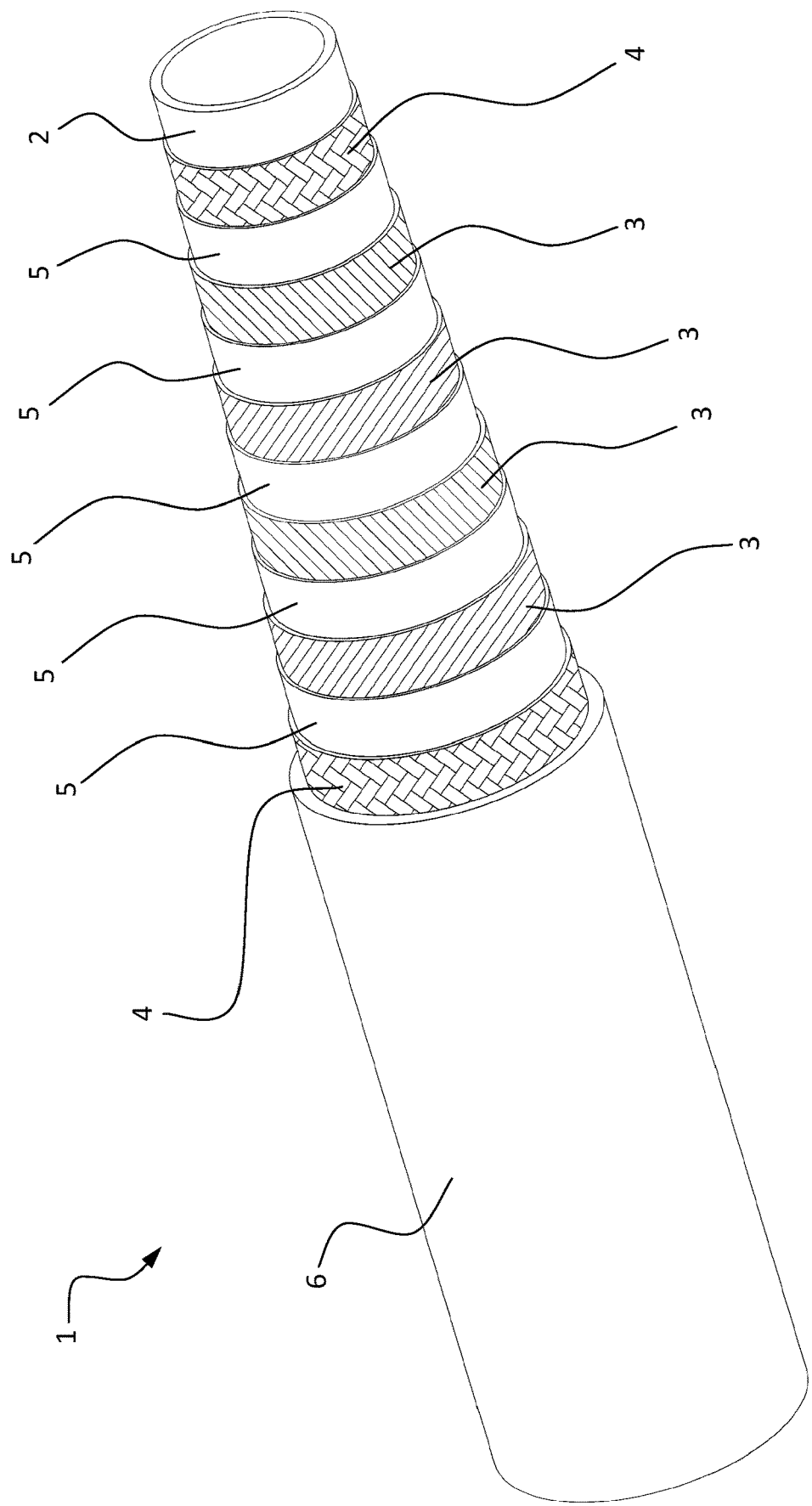
FIG. 1 is a sectioned perspective view of a first embodiment of a hydraulic hose made according to the invention.
Figure 2:
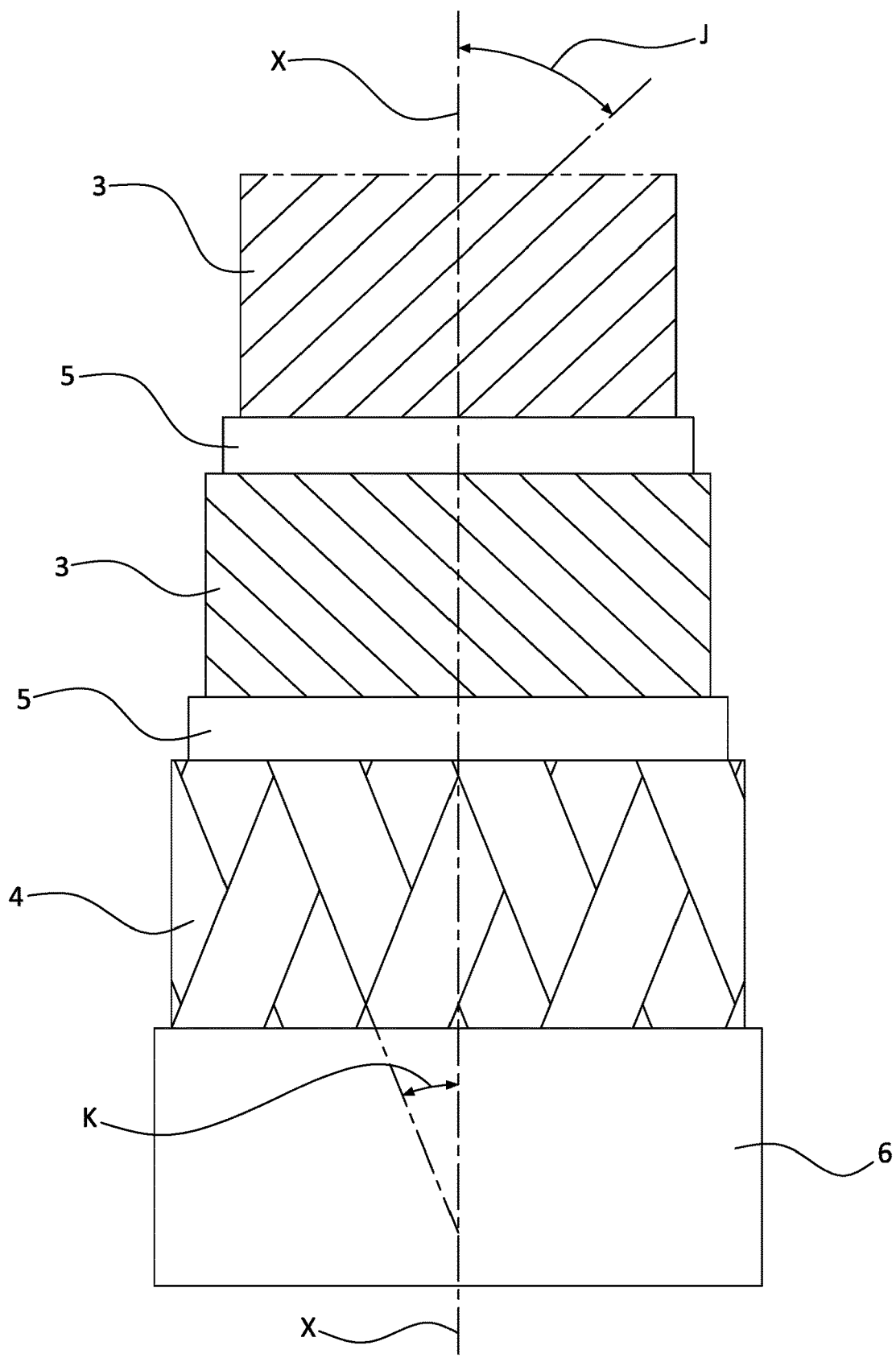
FIG. 2 is a schematic side view of a portion of the hose of FIG. 1.

With reference to the aforesaid figures, it is observed that identical elements of different embodiments having been indicated, for the sake of simplicity, by the same numbering.

A hose that is usable for conveying a fluid has been indicated overall by 1. The hose 1 may be used, in particular, for conveying a hydraulic fluid (for example oil) at high pressure to a hydraulic application. Merely by way of non-limiting example, the hose 1 could be used in off-shore applications, or in foundation plants (for example in plants provided with at least one hydromill and with at least one apparatus for gripping the hose).

The hydraulic hose could be used, in particular, to supply a hydraulic fluid (oil) to transmit energy to a user (for example a tool operating at a depth). The hydraulic hose 1 may be a very long hose (for example also more than 100 metres) and may be suitable for being maintained, during use, in a rectilinear (for example vertical) configuration.

The hydraulic hose 1 may have an inner diameter comprised, in particular, between 5 and 102 mm, although it is possible to provide greater or lesser values. The hydraulic hose 1 may have an external diameter comprised, in particular, between 10 and 126 mm, although it is possible to provide greater or lesser values. The hydraulic hose 1 may be intended for use at an operating pressure comprised, for example, between 620 and 100 bar, although it is possible to provide greater or lesser values.

The hydraulic hose 1 may be a multi-layer hose comprising, in particular, a plurality of layers superimposed on one another each of which may be of tubular shape. The hydraulic hose 1 may comprise, in particular, a substrate 2 extending along a central axis X and defining a hollow interior for conveying the fluid. The substrate 2 may be, as in this embodiment, the innermost layer of the hose 1. The substrate 2 may be made, in particular, of elastomeric material. This elastomeric material may comprise, in particular, synthetic rubber that is resistant to the conveyed fluid, for example nitrile based rubber (nitrile butadiene rubber NBR) or rubber of another type.

The hydraulic hose 1 may comprise, in particular, two or more anti-pressure reinforcing layers 3. The anti-pressure reinforcing layers 3 may be arranged, in particular, further outside the substrate 2. Each anti-pressure reinforcing layer 3 may comprise, in particular, a first coiled and/or plaited wire reinforcing structure. The wires of the first reinforcing structure may be helically wound and tilted, in particular, at a winding angle J having a value near 54.7° (neutral angle) with respect to the central axis X of the substrate 2. This angle is matched, as is known, by a stable and balanced reinforcing structure for the resistance to the internal pressure of the hose. The first reinforcing structure is structured, in particular, to improve the resistance to pressure inside the hose 1.

The first reinforcing structure may comprise, in particular, helically wound wires (coiled and/or plaited, in this specific embodiment coiled wires) arranged tilted at a winding angle J having a value equal to 54.7° or comprised in the range 54.7°±Δ°, where Δ° can be equal to 1°, or 2°, or 5°, or 10°.

In one specific embodiment, the wires of the first reinforcing structures are coiled wires tilted at the winding angle J with respect to the central axis X of the substrate. Each first reinforcing structure may comprise coiled wires in which the direction of the coil (right or left) changes from one anti-pressure reinforcing layer 3 to the other, in particular by alternating first one determined direction for one anti-pressure reinforcing layer 3 and then the opposite direction for another layer, for example the immediately more external layer. The number of anti-pressure reinforcing layers 3 may be, in particular, an even number of layers.

Each first reinforcing structure may comprise wires made of metal, in particular steel, for example of very tough steel, in particular with tensile strength greater than 2000 N/mm$^2$, but it is possible to provide other tensile strength values. Each first reinforcing structure may comprise, by way of example, coiled wires with a wire diameter comprised between 0.30 and 0.80 mm. In particular, each first reinforcing structure may comprise wires with a diameter greater than 0.25, or 0.30, or 0.35, or 0.40, or 0.45, or 0.50 mm. In particular, the first reinforcing structure may comprise wires with a diameter less than 0.75, 0.80, or 0.85, or 0.90, or 0.95, or 1.00 mm.

The hydraulic hose 1 may comprise, in particular, at least one anti-tensile stress reinforcing layer 4. The anti-tensile stress reinforcing layer 4 may comprise, in particular, a second reinforcing structure of helically wound wires (for example plaited and/or coiled) that may be tilted, for example, at a winding angle K, with reference to the central axis X of the substrate 2, which is lower than the winding angle J of the first reinforcing structure/s. The second reinforcing structure is configured and structured, in particular, so as to improve the resistance to tensile stress on the hose 1.

The second reinforcing structure may comprise, in particular, helically wound (plaited and/or coiled) wires that are arranged tilted, with respect to the central axis X of the substrate 2, at a winding angle K that is less than 35°. The aforesaid winding angle K could also be chosen with a value that is less than 32°, or 30°, or 28°, or 26°, or 24°. In one specific embodiment, the (plaited and/or coiled) wires of the second reinforcing structure are tilted at a winding angle K comprised between 25° and 30° with respect to the central axis X of the substrate 2.

The hose 1 may comprise, as in the specific embodiment of FIG. 1, two anti-tensile stress reinforcing layers 4 in each of which the second reinforcing structure comprises wires plaited to form a plait of tubular shape at a winding angle K with the values indicated above. It is possible to provide, in other embodiments, for the hose comprising two or more anti-tensile stress reinforcing layers in each of which the second reinforcing structure comprises coiled wires (with alternating opposite directions, the one right and the other left) at a winding angle K that is less than 35°. In the case of two or more anti-tensile stress reinforcing layers, the winding angle K of each second reinforcing structure could be chosen with a value that is less than 32°, or 30°, or 28°, or 26°, or 24°, 22°, or 20°, or 18°, or 16°, or 14°.

The hose 1 may comprise, as in the specific embodiment of FIG. 1, a first anti-tensile stress reinforcing layer 4, more internal than the various anti-pressure reinforcing layers 3, and a second anti-tensile stress reinforcing layer 4, that is more external than the various anti-pressure reinforcing layers 3. The second anti-tensile stress reinforcing layer 4 is contiguous with a more external covering layer 6. The first anti-tensile stress reinforcing layer 4 is contiguous with the more internal substrate 2.

Figure 3:
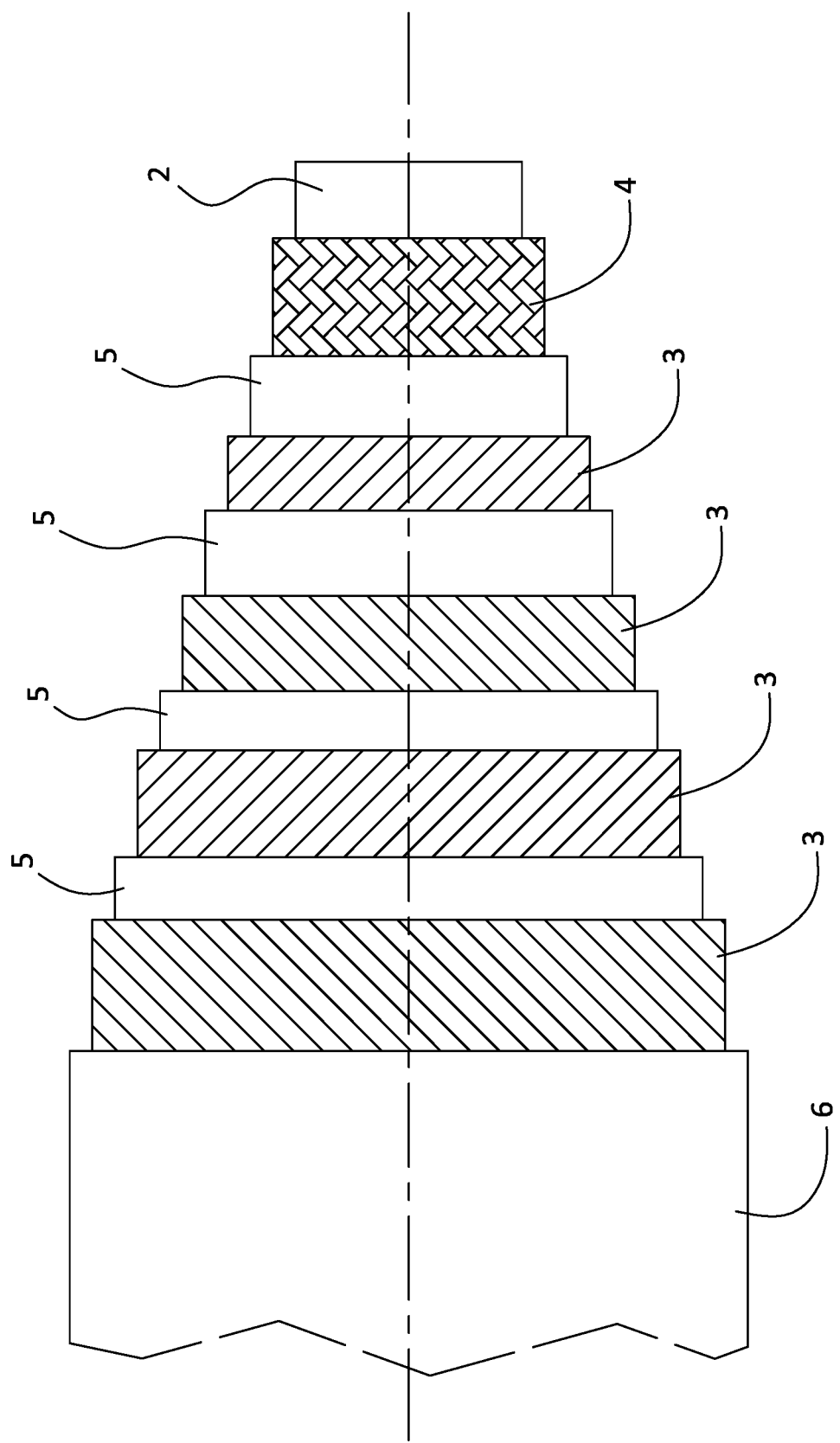
FIG. 3 is a sectioned schematic side view of a second embodiment of a hydraulic hose made according to the invention.

The hose 1 may comprise, as in the embodiment of FIG. 3, only the first more internal anti-tensile stress reinforcing layer 4, whilst the second more external anti-tensile stress reinforcing layer is absent.

Figure 4:
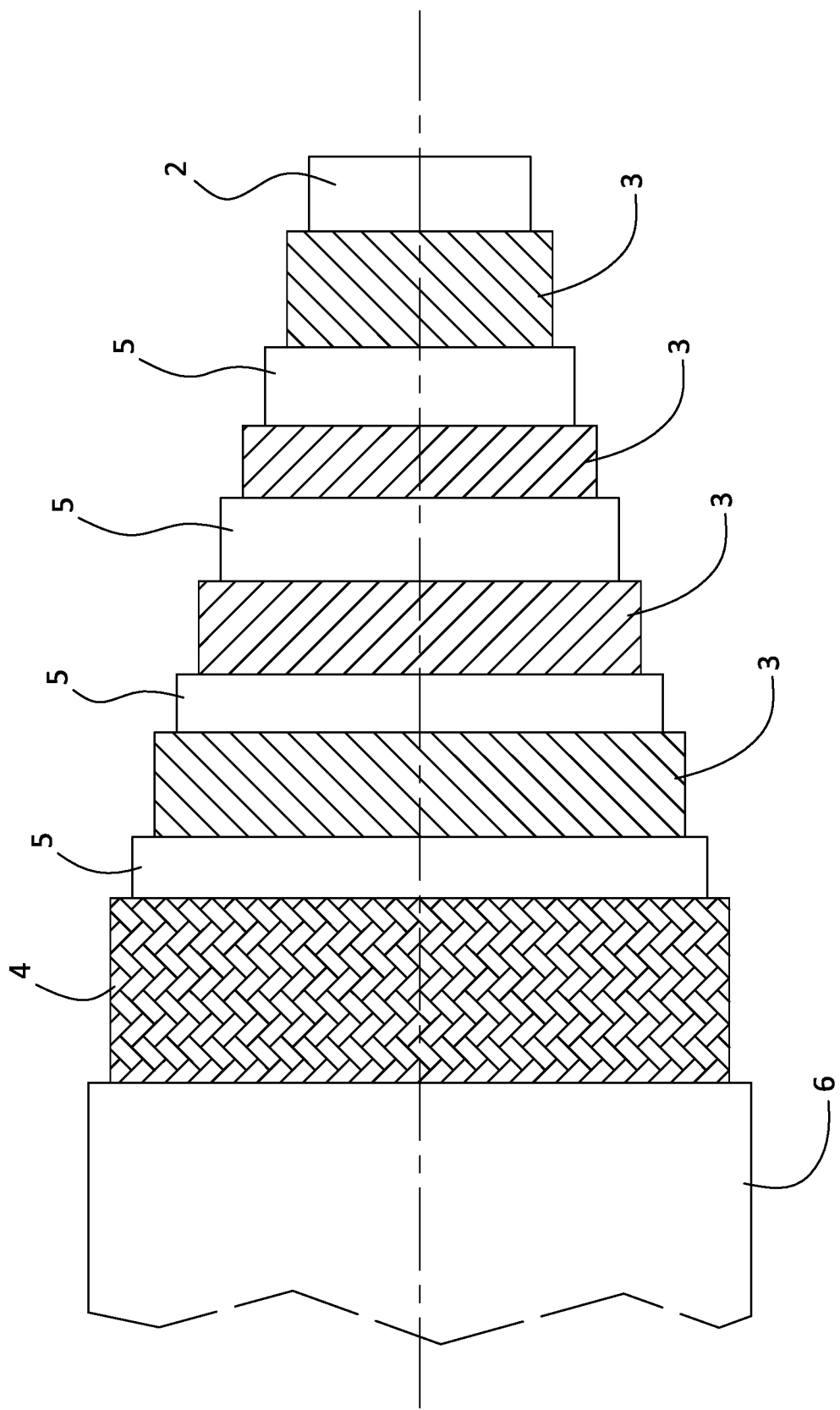
FIG. 4 is a sectioned schematic side view of a third embodiment of a hydraulic hose made according to the invention.

The hose 1 may comprise, as in the embodiment of FIG. 4, only the second more external anti-tensile stress reinforcing layer 4, whereas the first more internal anti-tensile stress reinforcing layer is absent.

Figure 5:
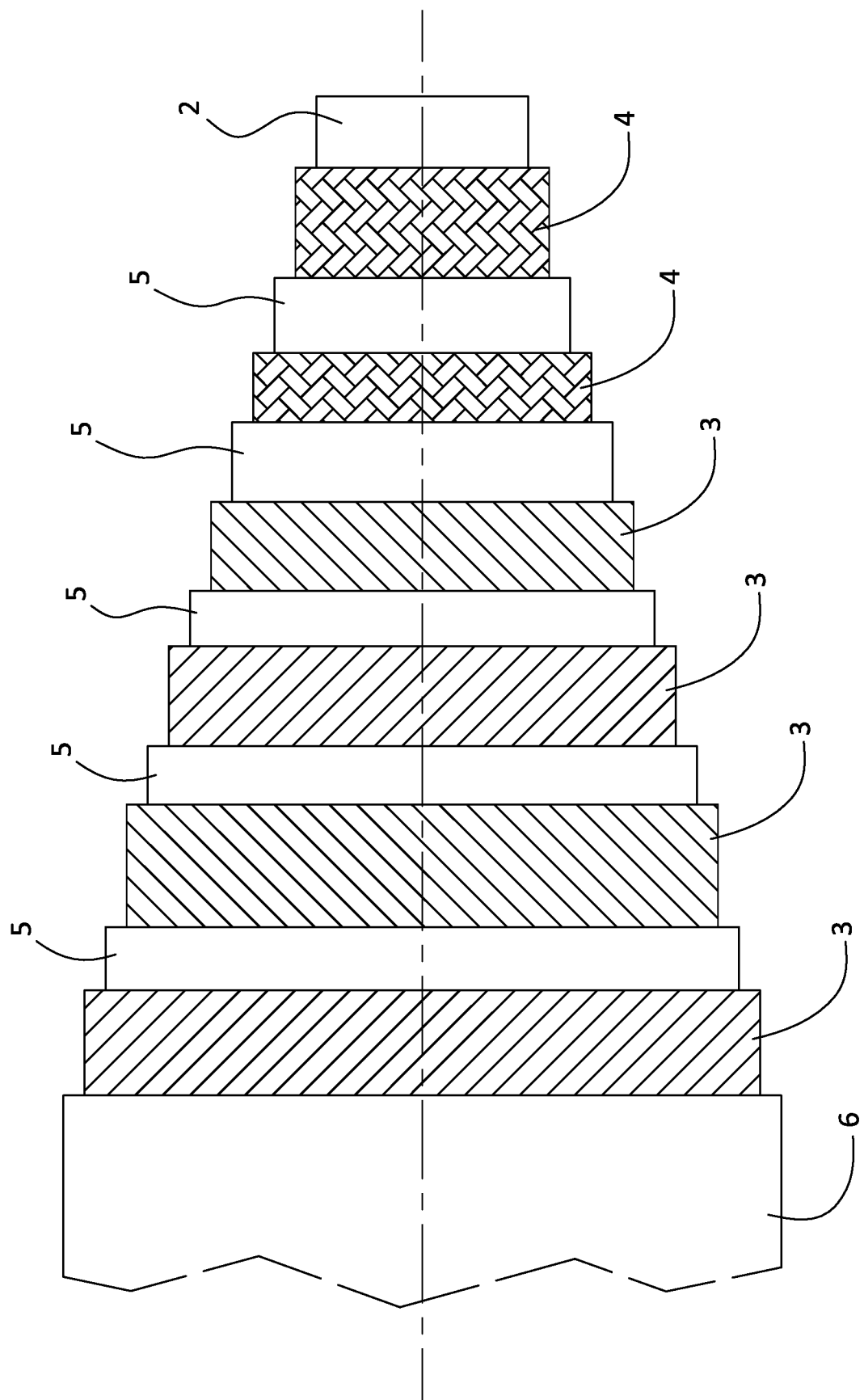
FIG. 5 is a sectioned schematic side view of a fourth embodiment of a hydraulic hose made according to the invention.

The hose 1 may comprise, as in the embodiment of FIG. 5, two first more internal anti-tensile stress reinforcing layers 4, in the absence of any second more external anti-tensile stress reinforcing layer.

Figure 6:
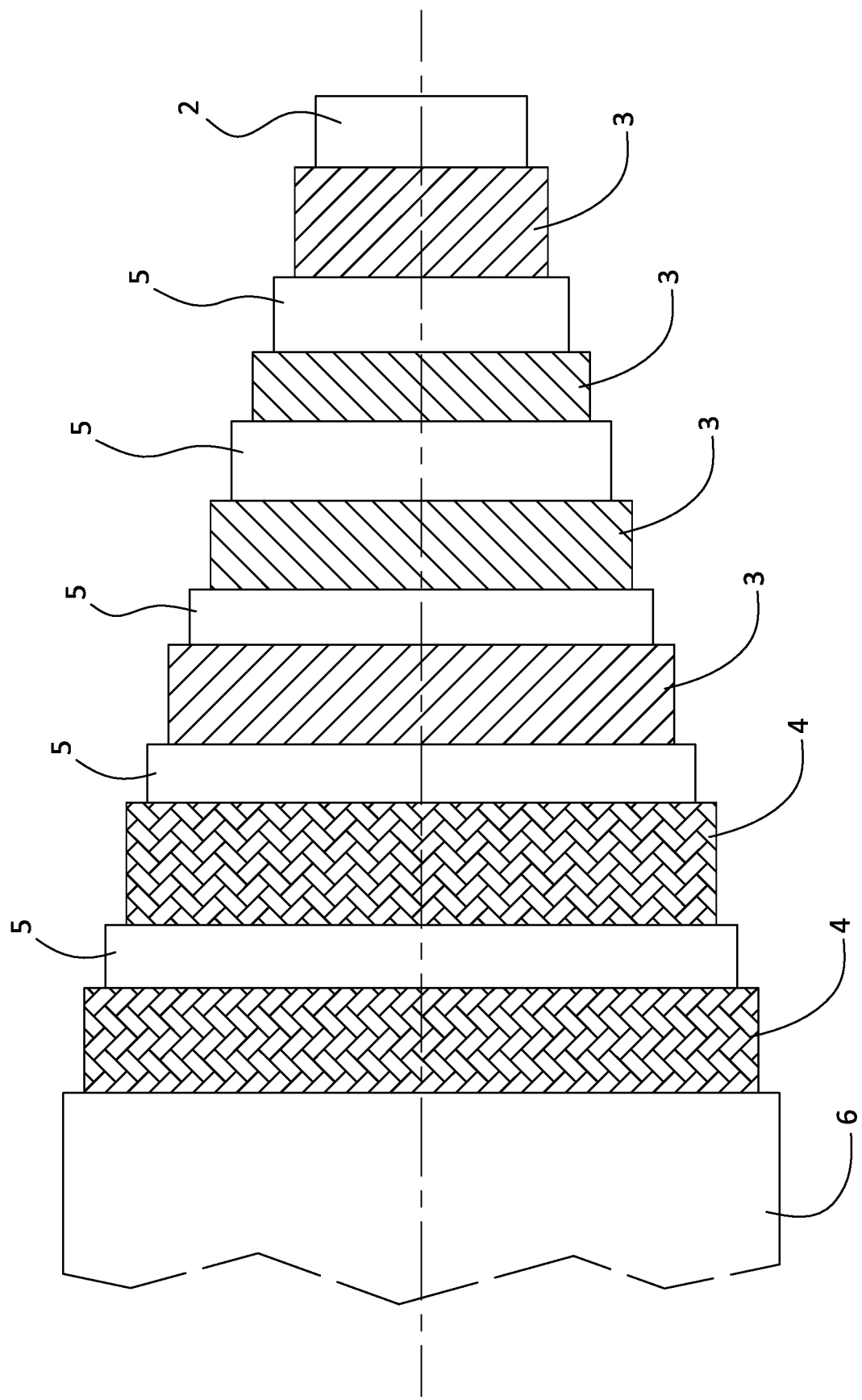
FIG. 6 is a sectioned schematic side view of a fifth embodiment of a hydraulic hose made according to the invention.

The hose 1 may comprise, as in the embodiment of FIG. 6, two second more external anti-tensile stress reinforcing layers 4, in the absence of any first more internal anti-tensile stress reinforcing layer.

The hose 1 may comprise, in other embodiments that are not illustrated, two or more second more external anti-tensile stress reinforcing layers, in the presence of one or more first more internal anti-tensile stress reinforcing layers. The hose 1 may comprise, in other embodiments that are not illustrated, two or more first more internal anti-tensile stress reinforcing layers in the presence of one or more second more external anti-tensile stress reinforcing layers.

It is possible to provide, in other embodiments that are not illustrated for the hose to comprise two or more (internal and/or external) anti-tensile stress reinforcing layers 4 in which the second reinforcing structure may comprise, for at least one layer, wires plaited at a winding angle K and, for at least one other layer, coiled wires at a winding angle K.

Each second reinforcing structure may comprise, for example, wires (plaited and/or coiled) with a wire diameter comprised between 0.20 and 0.50 mm. In particular, each second reinforcing structure could comprise wires (plaited and/or coiled) with a wire diameter greater than 0.15, or 0.20, or 0.25 mm. In particular, each second reinforcing structure could comprise wires (plaited and/or coiled) with a wire diameter less than 0.45, or 0.50, or 0.55 mm.

The second reinforcing structure may comprise, for example, wires made of metal, in particular steel, for example of very tough steel, in particular steel with tensile strength above 2000 N/mm$^2$, although it is possible to provide other tensile strength values.

Each second reinforcing structure could comprise, for example, plaited (textile) yarns, for example with a linear density comprised between 1000 and 5000 deniers. Each second reinforcing structure could comprise, for example, plaited (textile) yarns, for example with a linear density greater than 1000, or 1500, or 2000 denier. The second reinforcing structure may comprise, for example, plaited (textile) yarns with a linear density less than 3000, or 4000, or 5000 denier. It is nevertheless possible to provide for the use of plaited textile yarns with other linear density values.

Each anti-tensile stress reinforcing layer 4 may be extended, in particular, over the complete length of the substrate 2.

In the case of hoses 1 comprising two or more anti-tensile stress reinforcing layers 4, the second reinforcing structure of a layer could be the same as the second reinforcing structure of the other layer/s or be different, although having a winding angle K as disclosed above for each second reinforcing structure.

The hydraulic hose 1 may comprise, in particular, two or more intermediate layers 5 further inside the second anti-tensile stress reinforcing layer 4 and/or further outside with respect to the first anti-tensile stress reinforcing layer 4. The intermediate layers 5, in particular with a bearing and/or wear resistance function, may be made, for example, of elastomeric material. This elastomeric material may comprise, in particular, synthetic rubber, for example rubber NBR (nitrile butadiene), or SBR (styrene butadiene) or yet another type.

At least one of the intermediate layers 5 may be situated, in particular, between two anti-pressure reinforcing layers 3. The hydraulic hose 1 may comprise, in particular, three, four or more anti-pressure reinforcing layers 3, all further inside the second anti-tensile stress reinforcing layer 4 and/or all further outside with respect to the first anti-tensile stress reinforcing layer 4. In the specific embodiment four anti-pressure reinforcing layers 3 are arranged. The anti-pressure reinforcing layers 3 may alternate, in particular, with the intermediate layers 5. All the anti-pressure reinforcing layers 3 and/or all the intermediate layers 5 may be, as in this embodiment, further inside the second anti-tensile stress reinforcing layer 4 and/or further outside with respect to the first anti-tensile stress reinforcing layer 4.

If the hydraulic hose 1 comprises two or more first anti-tensile stress reinforcing layers 4 and/or two or more second anti-tensile stress reinforcing layers 4, it is possible to provide for one or more intermediate layers 5 being comprised between the aforesaid two or more first or second anti-tensile stress reinforcing layers 4.

In the embodiments of FIGS. 1, 5, 6 and 7, the hose 1 comprises five intermediate layers 5. In the embodiments of FIGS. 3 and 4, the hose 1 comprises four intermediate layers 5.

The hydraulic hose 1 may comprise, in particular, a more external covering layer 6, for example more external than the anti-tensile stress reinforcing layers 4 and/or than the anti-pressure reinforcing layers 3 and/or than the intermediate layers 5.

The covering layer 6 may be made, in particular, of elastomeric material. This elastomeric material may comprise, in particular, synthetic rubber, for example CR (chloroprenic) rubber, or rubber of another type.

The covering layer 6 may be, as in this embodiment, the outermost layer of the hydraulic hose 1. The second anti-tensile stress reinforcing layer 4 may be, in particular, contiguous (in contact) with the covering layer 6. The second anti-tensile stress reinforcing layer 4 may form, as in this embodiment, an interface between the covering layer 6 and most external intermediate layer 5.

Figure 7:
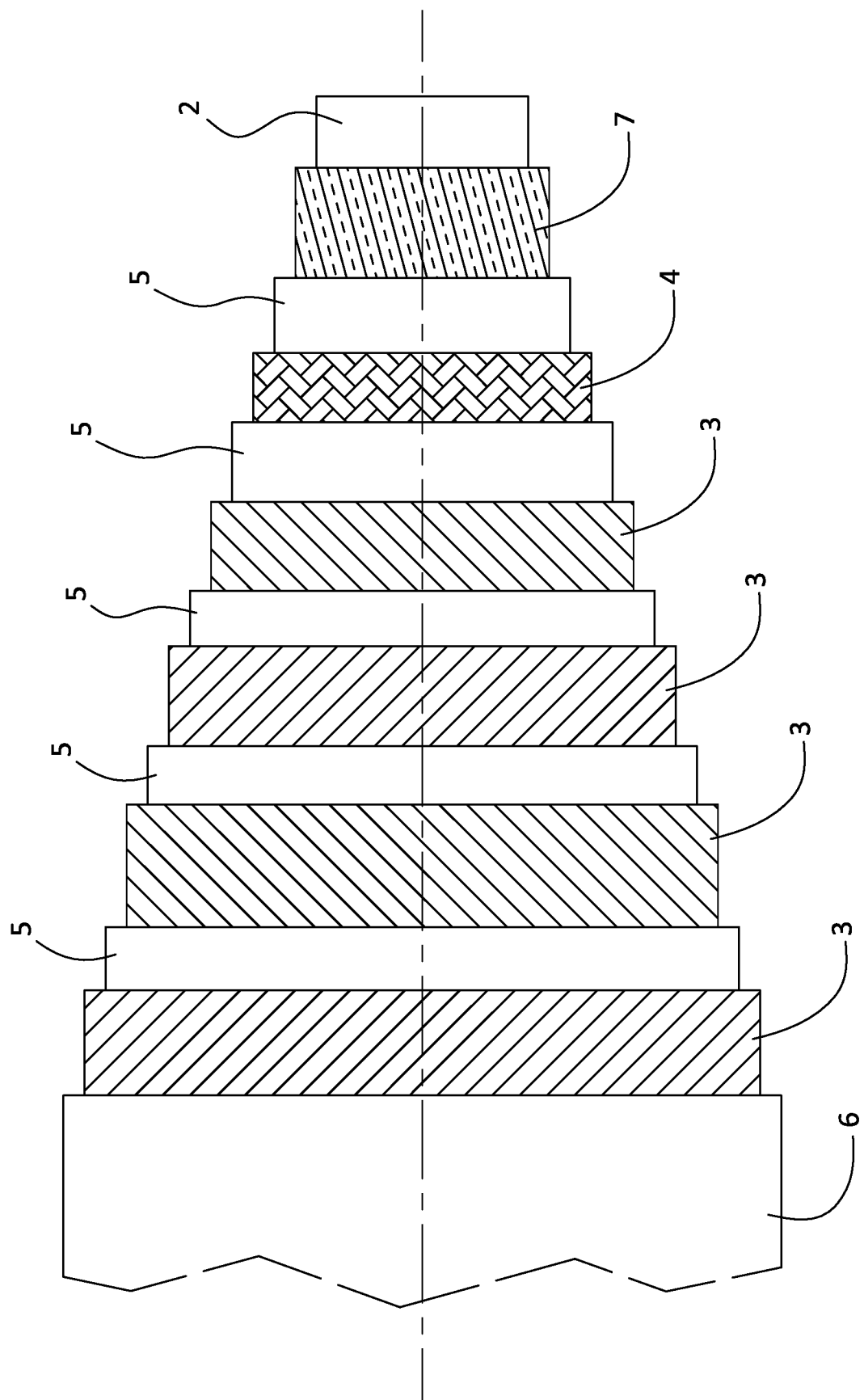
FIG. 7 is a sectioned schematic side view of a sixth embodiment of a hydraulic hose made according to the invention.

The hydraulic hose 1 may comprise, as in the specific embodiment of FIG. 7, at least one fabric layer 7 that may be, in particular, contiguous (in contact) with the substrate 2. The fabric layer 7 may be, as in this embodiment, contiguous (in contact) with the more internal intermediate layer 5, which, in turn, may be contiguous (in contact) with the first more internal anti-tensile stress reinforcing layer 4 or, in other embodiments, with the more internal anti-pressure reinforcing layer 3.

Figure 8:
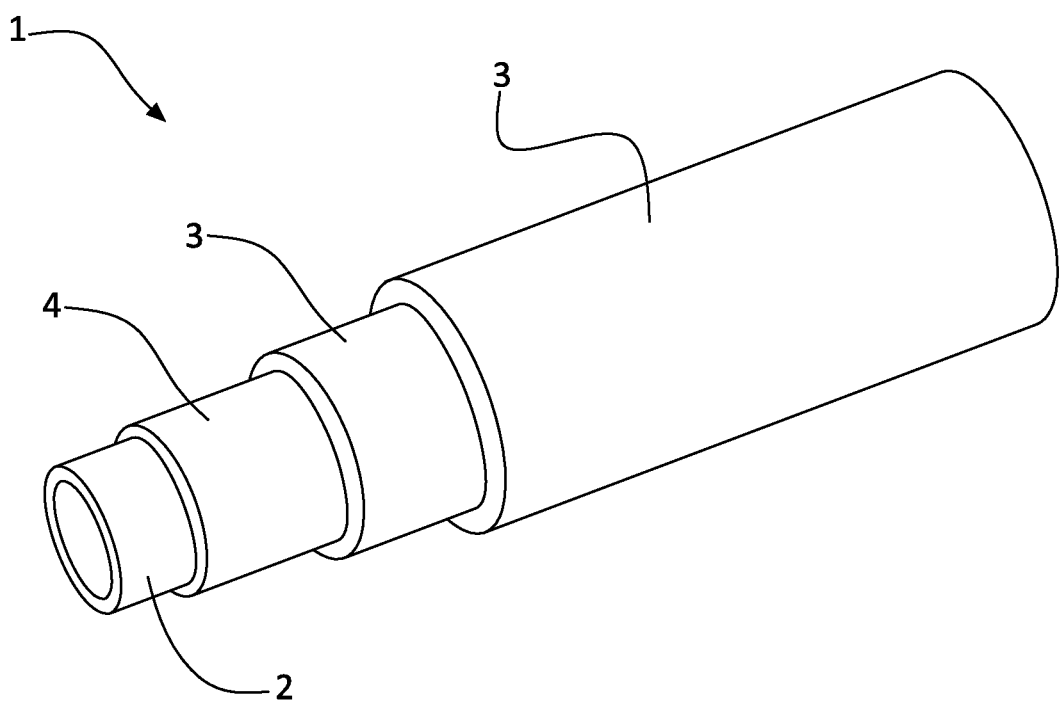
FIG. 8 is a sectioned schematic perspective view of a seventh embodiment of a hydraulic hose made according to the invention.
Figure 9:
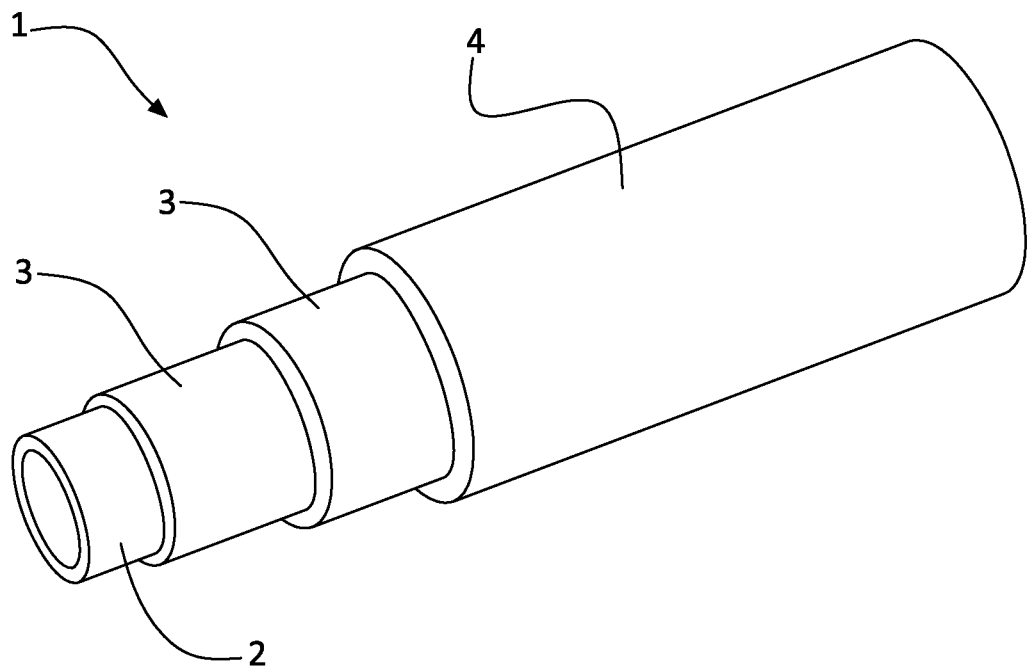
FIG. 9 is a sectioned schematic perspective view of an eighth embodiment of a hydraulic hose made according to the invention.

The embodiments illustrated in FIGS. 8 and 9 relate to multi-layer reinforced hoses comprising the substrate 2, at least two anti-pressure reinforcing layers 3, and at least one internal (FIG. 8) or external (FIG. 9) anti-tensile stress reinforcing layer 4. The embodiments of FIGS. 8 and 9 do not involve the use of intermediate layers 5 or of the covering layer 6.

The multi-layer hydraulic hose 1 may be configured, in particular, to support a weight comprised between 100 and 10000 kg, with tensile strain up to at least 3%, or 4% or 5%, or 10%, without breakage occurring.

As has been seen, the hydraulic hose 1 comprises at least one anti-tensile stress reinforcing layer 4 that is configured and structured specifically to withstand axial (tensile) stress exerted on the hose, whilst the resistance offered by the anti-tensile stress reinforcing layer 4 to the internal pressure of the hose can be substantially negligible, or anyway significantly less than the pressure exerted by an anti-pressure reinforcing layer 3. It has also been seen that this anti-tensile stress reinforcing layer 4 may comprise (steel) wires that are helically wound (in particular forming a plait) with a relatively long winding pitch (longer than the winding pitch of the wires of an anti-pressure reinforcing layer 3) and thus at a relatively small winding angle K (smaller than the winding angle J of the wires of an anti-pressure reinforcing layer 3). The arrangement of one or more anti-tensile stress reinforcing layers 4 improves significantly the resistance to the axial load of the hose 1, which can be accordingly maintained safely in a rectilinear, (for example vertical), operating configuration with a correspondingly much reduced risk of collapse, in particular without the need to set up apposite support means outside the hose.

The invention claimed is:

1. A reinforced multi-layer hydraulic hose, comprising:
   a substrate, made of elastomeric material, that defines an internal cavity for conveying a fluid and that extends along an axis;
   four or more anti-pressure reinforcing layers, more external than said substrate, each of which comprises a first reinforcing structure with helically wound wires with winding angle in the range 54.7°±10° with respect to said axis, to withstand a pressure inside the hose;
   at least one first anti-tensile stress reinforcing layer, more internal than said four or more anti-pressure reinforcing layers, comprising a second reinforcing structure with helically wound wires with winding angle of less than 35° with respect to said axis, to withstand an axial force on the hose;
   at least one second anti-tensile stress reinforcing layer, more external than said four or more anti-pressure reinforcing layers, comprising a third reinforcing structure with helically wound wires with winding angle of less than 35° with respect to said axis, to withstand an axial force on the hose;
   four or more intermediate layers, made of elastomeric material, more internal than said second anti-tensile stress reinforcing layer and more external than said first anti-tensile stress reinforcing layer, said four or more intermediate layers alternating with said anti-pressure reinforcing layers;
   a covering layer, made of elastomeric material, more external than said second anti-tensile reinforcing layer.

2. The hose according to claim 1, wherein said winding angle of the wires of said second reinforcing structure of said at least one first anti-tensile stress reinforcing layer and of said third reinforcing structure of said at least one second anti-tensile stress reinforcing layer is in the range of 25° to 30° with respect to said axis.

3. The hose according to claim 1, wherein said winding angle of the wires of said first reinforcing structure is in the range 54.7°±5° with respect to said axis.

4. The hose according to claim 1, wherein said at least one second anti-tensile stress reinforcing layer is contiguous with said covering layer.

5. The hose according to claim 1, wherein said at least one first anti-tensile stress reinforcing layer is contiguous with said substrate.

6. The hose according to claim 1, wherein said second reinforcing structure comprises plaited wires with a wire diameter of between 0.20 and 0.50 mm.

7. The hose according to claim 1, wherein said second reinforcing structure comprises plaited textile yarns with a linear density of between 1.000 and 5.000 deniers.

8. The hose according to claim 1, wherein said first reinforcing structure comprises coiled wires.

9. The hose according to claim 1, wherein said hose comprises a fabric layer which realizes an interface between said substrate and the innermost of said four or more intermediate layers.

10. The hose according to claim 1, comprising at least one third anti-tensile stress reinforcing layer, comprising said second reinforcing structure, which is more internal than said four or more anti-pressure reinforcing layers.

11. The hose according to claim 1, comprising at least one fourth anti-tensile stress reinforcing layer, comprising said second reinforcing structure, which is more external than said four or more anti-pressure reinforcing layers.

12. The hose according to claim 1, wherein:
   said substrate is made of synthetic rubber resistant to the transported fluid;
   said first reinforcing structure comprises metal wires;
   said second reinforcing structure comprises metal wires;
   said four or more intermediate layers are made of synthetic rubber; and
   said covering layer is made of synthetic rubber.

13. The hose according to claim 1, wherein said first reinforcing structure comprises steel wires and said second reinforcing structure comprises steel wires.

14. The hose according to claim 1, configured to support a weight between 100 and 10000 kg, with a tensile strain of up to at least 3%, or 4% or 5%, or 10%, without the break occurs.

15. The hose according to claim 1, wherein said second reinforcing structure with helically wound wires of said at least one first anti-tensile stress reinforcing layer includes plaited wires.

16. The hose according to claim 1, wherein said third reinforcing structure with helically wound wires of said at least one second anti-tensile stress reinforcing layer includes plaited wires.

17. The hose according to claim 1, wherein the helically wound wires of the first reinforcing structure are coiled and/or plaited wires.

18. The hose according to claim 1, wherein the third reinforcing structure of said at least one second anti-tensile stress reinforcing layer is the same as the second reinforcing structure of said at least one first anti-tensile stress reinforcing layer.

* * * * *